United States Patent [19]

White

[11] 4,156,770

[45] May 29, 1979

[54] ACYL COUPLED POLYMERS OF QUINONE-COUPLED POLYPHENYLENE OXIDES

[75] Inventor: Dwain M. White, Schenectady, N.Y.

[73] Assignee: General Electric Company, Schenectady, N.Y.

[21] Appl. No.: 800,656

[22] Filed: May 26, 1977

[51] Int. Cl.$^2$ ............... C08G 65/44; C08G 65/46
[52] U.S. Cl. ............... 528/213; 528/212; 528/214; 528/215
[58] Field of Search ............... 260/47 ET; 528/212, 528/213, 214, 215

[56] References Cited

U.S. PATENT DOCUMENTS

| | | | |
|---|---|---|---|
| 3,375,228 | 3/1968 | Holoch et al. | 260/47 |
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; Joseph T. Cohen; Charles T. Watts

[57] ABSTRACT

Linear, branched and/or cross-linked acyl coupled polymers of quinone-coupled polyphenylene oxides are described which comprise di- and/or tri-functional acyl radicals coupled with polyphenoxy radicals, said polyphenoxy radicals being derived from quinone-coupled polyphenylene oxides having an average hydroxyl group per molecule value greater than zero including 2.0 or less. The resulting polyphenylene oxides can be used to prepare various articles of manufacture.

15 Claims, No Drawings

ACYL COUPLED POLYMERS OF QUINONE-COUPLED POLYPHENYLENE OXIDES

CROSS REFERENCE TO RELATED APPLICATIONS

This invention is related to subject matter disclosed in my copending U.S. application Ser. Nos. 800,635, 800,641 and 800,644, all filed on May 26, 1977. All of the aforesaid applications are also my inventions, are assigned to the same assignee as the assignee of this application, and are incorporated herein in their entirety by reference.

BACKGROUND OF THE INVENTION

1. Field of the Invention

This invention relates to linear, branched, and/or cross-linked acyl coupled polymers of quinone-coupled polyphenylene oxides which comprise di- and tri-functional acyl radicals coupled with polyphenoxy radicals, said polyphenoxy radicals being derived from quinone-coupled polyphenylene oxides having an average hydroxyl group per polymer molecule value greater than zero including 2.0 or less, and mixtures thereof.

In my copending U.S. application Ser. No. 800,635 new polyphenylene oxide-quinone coupled polymers having an average hydroxyl group per molecule value greater than zero including 2.0 or less are described. These new polymers either alone or in combination with polyphenylene oxide reaction products of the prior art, i.e., polyphenylene oxides having an average hydroxyl group per molecule value greater than zero including 1.0 or less, or combinations thereof can be coupled with acyl halides to form new linear, branched, and/or cross-linked polyphenylene oxide polymers. The polymers prepared as described herein having hydroxyl groups associated with any phenoxy group of the acyl coupled polymers can be coupled and/or capped as described in Loucks et al.'s related U.S. application Ser. Nos. 800,645 or 800,648, filed on May 26, 1977 to further enhance their molecular weight and/or color stability, respectively.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879, 3,914,266, application Ser. No. 540,473, filed Jan. 13, 1975, now U.S. Pat. No. 4,028,341, a continuation-in-part of Ser. No. 441,295, filed Feb. 11, 1974, now abandoned, and Olander's, U.S. Pat. Nos. 3,956,442; 3,965,069; 3,972,851 and Ser. No. 582,910, filed June 2, 1975, now U.S. Pat. No. 4,054,553.

Coupled polymers of prior art polyphenylene oxides employing simple bifunctional coupling compounds such as diacyl halides, diisocyanates, bis(haloaryl)sulfones, etc., are described in my U.S. Pat. Nos. 3,793,564; 3,770,850, 3,809,729; and 3,875,256.

DESCRIPTION OF THE INVENTION

This invention embodies new linear, branched, and/or cross-linked acyl coupled polymers of quinone-coupled polyphenylene oxides which comprise di- and/or tri-functional acyl radicals coupled with polyphenoxy radicals, said polyphenoxy radicals being derived from quinone-coupled polyphenylene oxide polymers having an average hydroxyl group per molecule value greater than zero including 2.0 or less, and mixtures thereof.

The quinone-coupled polyphenoxy radicals (sometimes referred to herein as divalent polyphenoxy radicals, and also sometimes abbreviated by the formula —B—) are derived from quinone-coupled polyphenylene oxide polymers having an average hydroxyl group per molecule greater than zero including 2.0 or less. These polyphenylene oxides can be prepared by any of the methods described in my previously referred to U.S. application Ser. No. 800,635. Divalent quinone-coupled polyphenoxy radicals of a presently preferred class are illustrated by the formula:

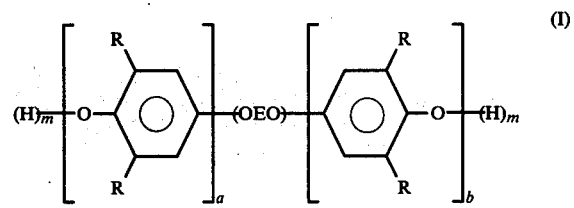

wherein independently each —(OEO)— is divalent quinone residue, E is a divalent arene radical, either a or b is at least equal to 1, the sum of a plus b is at least equal to 10, preferably 40 to 170, m is zero, and R is hydrogen, a hydrocarbon radical, a halohydrocarbon radical, a hydrocarbonoxy radical or a halohydrocarbonoxy radical. Corresponding quinone-coupled polyphenylene oxide precursors are illustrated by formula (I) wherein —OEO—, E, a, b, the sum of a plus b, and R is the same as defined in formula (I) above, and m is a number greater than zero including 2.0 or less.

The acyl radicals (sometimes referred to herein as di and/or tri-functional acyl residues, and also sometimes abbreviated by the formula —Z— and

are derived from any acyl halide subject to the proviso that the acyl halide have at least two halide coupling reaction sites. The term "acyl halide" includes any di- or tri-acyl halide illustrated by the formula:

where c is a number at least equal to 2, X is a halogen, e.g. fluorine, chlorine, bromine or iodine, but preferably chlorine, and R″ is $C_{1-8}$ alkylene, $C_{1-8}$ alkenylene, phenylene, halophenylene and $C_{1-8}$ alkyl substituted phenylene.

Illustrative of a portion of presently preferred acyl halides are the acid halides of the following acids: malonic, succinic, maleic, fumaric, itaconic, mesaconic, citraconic, glutaric, adipic, pimelic, suberic, azelaic, trimellitic, phthalic, isophthalic, terephthalic and the above phthalic acids having from one to four halogens, preferably chloro substituents or from one to four $C_{1-8}$ alkyl substituents. The preferred phthalic acid halides are unsubstituted or have from 1 to two chlorine substituents.

Illustrative of the broad group of acyl polymers of quinone-coupled polyphenylene oxides that are included in the scope of this invention, among others, are those described by the following illustrative linear, branched and cross-linked polymer structures:

(III linear)  BZB, BZA, BZBZ, AZBZA, BZBZA, BZBZB, AZBZBZBZA, etc.

(III branched)
```
                    AZA
     A  B B   B A    B
     BZB, BZBZB, BZBZA, AZBZBZA, etc.
```

(III cross-linked)
```
           A         A
       A   Z     Z   A
       BZBZBZB, AZBZBZB, AZBZBZBZA, etc.
       B   B     B   B     B   B
       AZBZBZBZA  AZBZBZA  AZBZBZA
           A         A
```

As illustrated by formulas (III) above, linear, branched, and cross-linked combinations of divalent polyphenoxy radicals (—B—), and di- and/or tri-functional acyl radicals (—Z— or $$-\overset{|}{Z}-)$$

can be capped with monovalent phenoxy radicals (sometimes referred to herein as monovalent phenoxy radicals, and also sometimes abbreviated by the formula —A) derived from polyphenylene oxides having an average hydroxyl group per molecule value greater than zero including 1.0 or less. These polyphenylene oxides can be prepared by any of the methods known to those skilled in the art including those referenced hereinbefore. Monovalent phenoxy residues of a presently preferred class are illustrated by the formula:

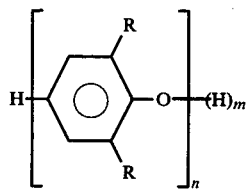

(IV)

wherein independently each R is hydrogen, a hydrocarbon radical, a halohydrocarbon radical, a hydrocarbonoxy radical or a halohydrocarbonoxy radical, n is a number of at least 10, preferably 40 to 170, and m is zero. Corresponding polyphenylene oxide precursors are illustrated by formula (IV) wherein R and n are as defined above, and m is a number greater than zero including 1.0 or less.

As illustrated, the linear, branched and cross-linked combinations of monovalent and divalent radicals represented empirically by the letters A, B and Z of formulas (III) above are not intended to limit the combinations that can be attained by the practice of this invention since such combinations are limited only by the stoichiometric amount of precursors of the various radicals charged to the reaction medium in carrying out the process of this invention. Preferred acyl coupled polymers are polymers wherein resulting quinone-coupled polyphenylene oxide polymer are essentially linear polymers and more preferably are essentially linear polymers wherein all available hydroxyl components have been either coupled or capped so that the hydroxyl content of the resulting polymer is essentially nil.

The acyl coupling of quinone-coupled polyphenylene oxides is preferably carried out in the presence of a water soluble base and more preferably in an aqueous solution of the water soluble base, e.g. in an aqueous alkaline metal or alkaline earth metal hydroxide or carbonate. Specific examples include aqueous solutions of potassium hydroxide, sodium hydroxide, sodium monocarbonate, barium carbonate, etc.

In addition, preferably, the process is carried out in the presence of a catalytic phase transfer agent as well as the water soluble base. The phase transfer agent can be any selected from the group consisting of quaternary ammonium, quaternary phosphonium, and tertiary sulfonium compounds or mixtures thereof. Catalytic phase transfer agents can be described by the formulas:

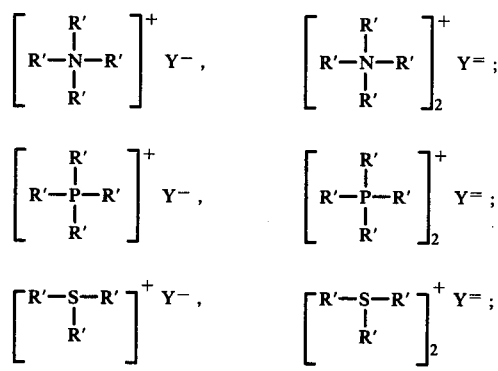

wherein each R' is independently selected from aliphatic hydrocarbon radicals having from about 1 to about 30 carbon atoms, preferably from about 2 to about 15 carbon atoms, each X⁻ is selected from the group consisting of Cl⁻, Br⁻, F⁻, $CH_3SO_3^-$, $CH_3CO_2^-$, $CF_3CO_2^-$ or OH⁻, and each Y⁻⁻ is selected from the group consisting of $SO_4^{--}$, $CO_3^{--}$, or $C_2O_4^{--}$.

In general, the process of acyl coupling the quinone coupled polyphenylene oxides comprises contacting the quinone-coupled polyphenylene with an acylating agent in the presence of an aqueous solution of a water soluble base and a catalytic phase transfer agent. Any amount of acylating coupling agent can be employed, however, for obvious reasons, economic primarily, the amount of acylating agent employed is preferably a stoichiometric amount required to react with all of the hydroxyl groups associated with the reaction products of the quinone-coupled polyphenylene oxides. Accordingly, the quantities of capping agent employed can vary from 1/1000 to 1000 times the stoichiometric requirements required to completely couple all of the hydroxyl groups associated with the polymer.

Any amount of water soluble base can be employed, however generally effective mole proportions relative to the amount of acylating coupling agent that can be employed effectively are acylating agent:water soluble base proportions of from about 1:100 to about 50:1 and more frequently from about 1:10 to about 10:1.

Any amount of phase catalytic phase transfer agent can be employed relative to the amount of water soluble base. Generally effective molar proportions of catalytic phase transfer agent to water soluble base are within the range of from about 1:10 to about 1:1000 and more frequently within the range of from 1:100 to 1:1000.

The acyl coupling can be carried out at any reaction temperature but preferably is carried out at temperatures within the range of from 0° to 150° C. or even higher, more preferably from 50° C. to 100° C.

In order that those skilled in the art may better understand my invention, the following example is given which is illustrated with the best mode of practicing my invention.

EXAMPLE I

(A) Polymer Preparation, and (B) Catalyst Deactivation

A 2.5 gallon stainless steel reactor equipped with an air-driven paddle stirrer, oxygen inlet tube, and water-cooled coil and jacket was charged with 4.35 l. toluene, a catalyst stock solution formed by dissolving 0.78 g. of cuprous oxide in 5.9 g. of 48% hydrobromic acid, 1.2 g. of Aliquat ® 336, 3.38 g. N,N'-di-t-butylethylenediamine (DBEDA), 47.6 g. N,N-dimethylbutylamine (DMBA), and 12 g. di-n-butylamine (DBA). Oxygen was bubbled through the reaction medium at a rate of 7 SCFH and the mixture was stirred vigorously. 1200 g. 2,6-xylenol in 1.2 l. of toluene was pumped into the reactor over a 30-minute period and the reaction temperature was maintained at 25° C. The temperature was then allowed to rise to 38° C. After 50 minutes, the reaction product was contacted with an aqueous solution of the trisodium salt of EDTA to deactivate the catalyst. Summarily, the reaction parameters relative to molar ratios of 2,6-xylenol: Cu:DBEDA:DMBA:Br:DBA were as follows: 900:1:1.8:43:3.2:8.5.

(C) Quinone Coupling

A 500 g. portion of the reaction mixture as described in sections (A) and (B) above was transfered to a 1 l. flask equipped with stirrer, nitrogen inlet tube, distillation head and thermometer. With a steady nitrogen sweep, the mixture was heated to 90° C. and maintained at 90° C. for 30 minutes while 80 ml. of volatiles were entrained out of the flask. During this time, the deep orange TMDQ color disappeared leaving a very light yellow solution.

(D) Coupling With Isophthaloyl Chloride

The reaction mixture from part (C) above was cooled to 40° C. and transferred to a 1 l. Waring blender, kept under a nitrogen atmosphere and contacted with 0.5 g. Aliquat ® 336 and 6.4 g. 50% aqueous sodium hydroxide. The mixture was stirred in the blender at maximum speed and 3.2 g. crystalline isophthaloyl chloride was added over a two minute period. Stirring was continued an additional 2 minutes. Then 500 ml. toluene was added and the polymer was precipitated by the addition of 3 l. of methanol. The polymer was washed with methanol and dried at 80° C. The intrinsic viscosity of the polymer before coupling was 0.45 dl./g. and after coupling was 0.61 dl./g.

The phenolic hydroxyl absorbance at 3610 cm.$^{-1}$ (in carbon disulfide) was 0.064 absorbance units for a 2.5% solution of the initial polymer in a 1.0 cm. cell. The quinone coupling reaction increased the value to 0.150 absorbance units. After the isophthaloyl chloride coupling step the value was 0.003.

EXAMPLE II

(A) Polymer Preparation, and (B) Catalyst Deactivation

A 2.5 gallon stainless steel reactor equipped with an air-driven paddle stirrer, oxygen inlet tube, and water-cooled coil and jacket was charged with 4.6 l. toluene, a catalyst premix composed of 6.28 g. of cupric chloride, 9.62 g. of sodium bromide, 6.84 g. of Aliquat ® 336, 33.1 g. N,N-dimethylbutylamine (DMBA), and 42.3 g. di-n-butylamine (DBA). Oxygen was bubbled through the reaction medium at a rate of 10 SCFH with vigorous mixing of the reaction mixture. 2000 g. 2,6-xylenol in 2.4 l. of toluene was pumped into the reactor over a 30-minute period. The temperature of the reaction mixture rose to 45° C. and was maintained at 45° C. until after a total reaction time of 70 minutes, the polymer portion was precipitated with methanol containing 0.5% acetic acid, filtered and washed, dried in a circulating air oven at 80° C. Polymer analysis showed an intrinsic viscosity $[\eta]$ equal to 0.24 dl./g. and a TMDQ content less than 0.01% based on the weight of 2,6-xylenol. Summarily, the reaction parameters relative to molar ratios of 2,6-xylenol; Cu:DMBA:Br:DBA were as follows: 350:7:7:2:1.

Quinone Coupling

A reaction vessel equipped with a nitrogen inlet tube and a Vibromixer stirrer was charged with a solution of 10.00 g. of the polymer from part (A) above in 30 ml. chlorobenzene and with 0.20 g. 3,3',5,5'-tetramethyldiphenoquinone (TMDQ). The mixture was heated to 80° in an oil bath with stirring under nitrogen. The TMDQ gradually dissolved and the red-orange color of the TMDQ gradually diminished.

(D) Coupling With Isophthaloyl Chloride

After one hour the mixture was cooled to 45° C. and contacted with 0.5 ml. of a 10% Aliquat ® 336 solution in chlorobenzene and with 0.8 g. 50% aqueous sodium hydroxide solution. To the rapidly stirred mixture at 40° was added 0.55 g. isophthaloyl chloride crystals over a 5-minute period. Five minutes after the addition was completed the viscous mixture was diluted with 100 ml. benzene and the polymer was precipitated by adding slowly with stirring 400 ml. of methanol containing 1% acetic acid. The polymer was collected on a filter funnel washed with methanol and dried at 80° to constant weight (10.03 g.). The intrinsic viscosity of the initial polymer was 0.24 dl./g. After coupling with isophthaloyl chloride the intrinsic viscosity was 0.37 dl./g.

As illustrated by the foregoing examples, quinone-coupled polyphenylene oxides can be further coupled with acyl coupling agents to form high molecular weight polyphenylene oxides. Analogous results can be obtained wherein any of the acyl chemical equivalents set out in the specification are substituted for isophthaloyl chloride or with any of the phase transfer agents are substituted for the Aliquat ® 336 agent employed in the examples hereinbefore.

The acyl-coupled quinone-coupled polyphenylene oxides of our process can have any intrinsic viscosity and any number average molecular weight $\overline{M}_n$. Presently preferred polymers of our process generally have an $\overline{M}_n$ value of 5,000 to 60,000, more preferably 15,000 to 30,000, having generally corresponding intrinsic viscosities of 0.17 to 1.7, and 0.4 to 0.7, respectively.

The polymers of this invention can be combined with other fillers, modifying agents, etc., such as dies, pigments, stabilizers, flame retardant additives with beneficial results.

I claim:

1. A polymer comprising acyl-coupled quinone-coupled polyphenylene oxides.

2. The claim 1 compound, wherein the polymer contains a quinone-coupled phenoxy radical of the formula:

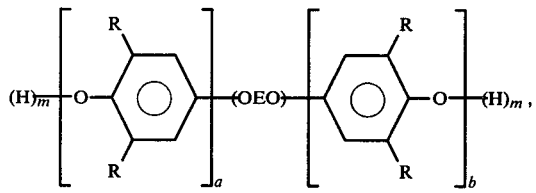

wherein independently each $-(\text{OEO})-$ is a divalent quinone residue, E is a divalent arene radical, either a or b is at least equal to 1, the sum of a plus b is at least equal to 10, m is zero, and R is hydrogen, a hydrocarbon radical, a halohydrocarbon radical, a hydrocarbonoxy radical or a halohydrocarbonoxy radical, and an acyl radical of the formula:

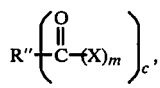

wherein C is a member at least equal to 2, X is a halogen, m is zero, and R'' is $C_{1-8}$ alkylene, $C_{1-8}$ alkylene, phenylene, halophenylene and $C_{1-8}$ alkyl substituted phenylene.

3. A claim 2 compound, wherein $-(\text{OEO})-$ is of the formula:

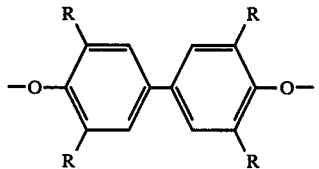

wherein independently each R is as defined hereinbefore.

4. A claim 2 compound, wherein the sum of a plus b is at least 10.

5. A claim 2 compound, wherein each R is hydrogen, a hydrocarbon, or a halohydrocarbon radical, and the sum of a plus b is 40 to 170.

6. A claim 5 compound, wherein each R is a methyl radical.

7. A process of forming acyl-coupled polymers of quinone-coupled polyphenylene oxide which comprises contacting an acyl halide with quinone-coupled polyphenylene oxides having an average hydroxyl group per molecule value greater than zero including 2.0 or less.

8. The claim 7 process, wherein the acyl halide is of the formula:

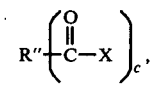

where c is a number at least equal to 2, X is fluorine, chlorine, bromine or iodine, and R'' is $C_{1-8}$ alkyl substituted phenylene, and wherein the quinone-coupled polyphenylene oxide is of the formula:

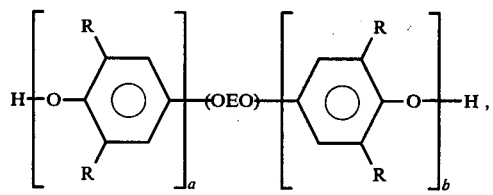

wherein independently each $-(\text{OEO})-$ is a divalent quinone residue, E is a divalent arene radical, either a or b is at least equal to 1, the sum of a plus b is at least equal to 10, and R is hydrogen, a hydrocarbon radical, a halohydrocarbon radical, a hydrocarbonoxy radical or a halohydrocarbonoxy radical.

9. The claim 8 process, wherein $-(\text{OEO})-$ is of the formula:

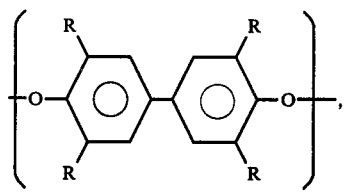

wherein independently each R is as defined hereinbefore.

10. The claim 9 process, wherein the sum of a plus b is 40 to 170.

11. The claim 10 process, wherein each R is hydrogen, a hydrocarbon, or a halohydrocarbon radical.

12. The claim 11 process, wherein each R is a methyl radical.

13. The claim 8 process, carried out in the substantial absence of a hydrolyzing agent.

14. The claim 13 process, carried out in the presence of water soluble base.

15. The claim 14 process, carried out in the presence of a catalytic phase transfer agent.

* * * * *